(No Model.)
J. W. WAINWRIGHT.
DRAFT EQUALIZER.
No. 317,897. Patented May 12, 1885.
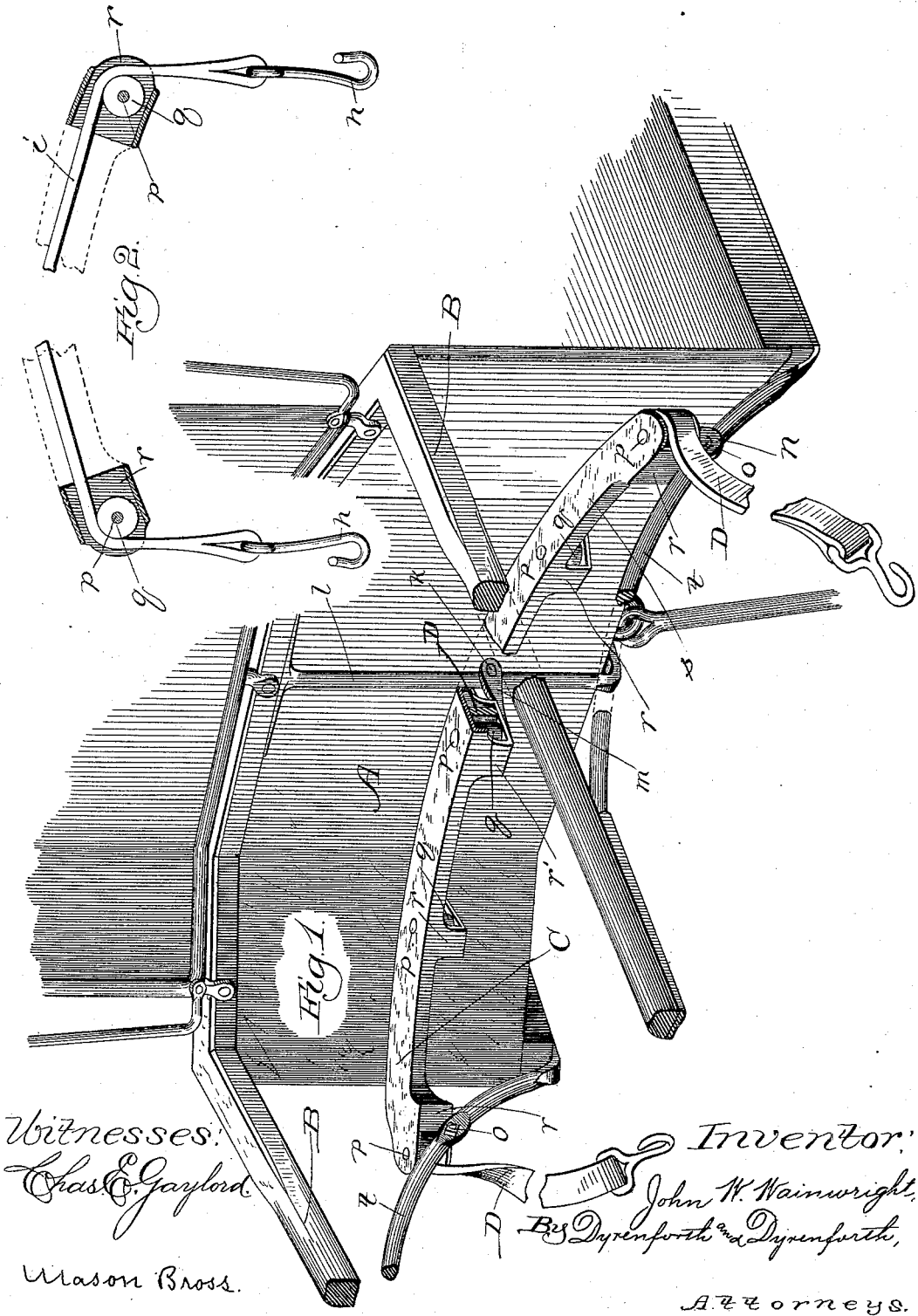
Witnesses:
Chas. E. Gaylord
Mason Bross.
Inventor:
John W. Wainwright,
By Dyrenforth and Dyrenforth,
Attorneys.

UNITED STATES PATENT OFFICE.

JOHN W. WAINWRIGHT, OF CHICAGO, ILLINOIS, ASSIGNOR OF ONE-HALF TO ALBERT B. PULLMAN, OF SAME PLACE.

DRAFT-EQUALIZER.

SPECIFICATION forming part of Letters Patent No. 317,897, dated May 12, 1885.

Application filed January 16, 1885. (No model.)

*To all whom it may concern:*

Be it known that I, JOHN W. WAINWRIGHT, a citizen of the United States, residing at Chicago, in the county of Cook and State of Illinois, have invented certain new and useful Improvements in Draft-Equalizers; and I hereby declare the following to be a full, clear, and exact description of the same.

My invention relates to the means for equalizing the draft of two-wheeled vehicles drawn by one horse; and it relates particularly to such a device for two-wheeled cabs.

Owing to the construction of the dash-board of vehicles of the last-named description, which is concave horizontally, to bring the horse as close as possible to his work and to the center of gravity of the cab, whereby, also, the hind quarters are hidden from the view of the occupant or occupants of the cab, the use of the ordinary whiffletree for equalizing the draft upon the animal is impracticable on account of the limited horizontal play permitted to it due to the shape of the dash-board. It has therefore hitherto been the ordinary custom to dispense with means for equalizing the draft in connection with two-wheeled cabs having concave dash-boards by hitching the animal, through the medium of the traces, to the vehicle directly or to the thills toward their rear ends, and sometimes to braces forming supports for the thills, and in various other ways. This practice is attended, however, with very serious consequences to the animal, since, as experience has shown, it is rendered lame and unfit for work in a very short time, and often permanently injured, by the inequality of the draft produced in turning or by the passage of one of the wheels over an obstruction or an elevation, which produces the strain that should be borne equally by both shoulders upon one of them only.

I overcome this difficulty by my invention, which consists in providing a continuous trace to pass around suitable bearings rigidly secured toward opposite sides of the forward part of the vehicle, and to be attached at its ends to the harness on opposite sides of the animal.

My invention further consists in the particular means which I prefer to employ in affording bearings for the continuous trace; and it consists, also, in certain details of construction and combinations of parts, all as hereinafter particularly set forth.

Referring to the drawings, Figure 1 represents in perspective the forward end of a Hansom cab provided with my continuous draft-equalizing trace, passing around bearings of the construction which I prefer to employ, and showing parts broken away to display details; and Fig. 2 a sectional view of the trace-bearing, showing a modification of the same.

A is the concave forward portion or dash-board of a Hansom cab, and B B are the thills, which are supported, as usual, by curved braces t t, extending upward and forward from opposite sides of the bottom of the vehicle to the lower sides of the thills B, to which they are secured.

C is the trace-receptacle, comprising the plate or bar s, curved, as shown, to conform longitudinally to the shape of the front side of the cab, and formed, preferably, of metal cast to the shape shown, and with housings r, and a housing, r', to receive pulleys or rollers q, provided with shafts in the form of transverse bolts p. The device C, as shown in Fig. 1, is placed with its convex edge adjacent to the concave front surface of the vehicle, and is rigidly secured toward its extremities to the braces t by bolts o, passing through the braces or through lugs formed thereon, if preferred, and through lugs n, projecting downward from the end housings, r. The central housing, r', is provided with backward-projecting arms m, to embrace the central rod, l, usually provided, and a bolt, k, is passed transversely through the arms m toward their rear extremities, behind the rod l, to increase the rigidity of the device C in its position.

D is a continuous trace, which is inserted through the housings r and r', passing over the rear sides of the pulleys or rollers q in a manner to permit the ends which are hitched to the harness upon the animal for connecting the latter with the vehicle to project.

The modification illustrated in Fig. 2 of the drawings, which represents my improved device C to be rigidly secured to the vehicle in the manner hereinbefore described, shows a convenient way of applying my invention without requiring a continuous trace of the form hereinbefore described, thereby permitting the form of traces in common use to be employed by attaching them toward their rear extremities to opposite ends of a short strip, $i$, in the form of a strap, rope, or chain passing over the rear sides of the pulleys or rollers $q$ within the housings $r$ and $r'$, and having its extremities project beyond the device C, and provided with hooks $h$ or clasps, to form the connecting medium for the traces, thereby to provide a practically continuous trace passing over rigid bearings.

Though pulleys or rollers are shown and hereinbefore described as forming the bearings of the continuous trace, they present only a preferred form of bearing, inasmuch as by their use friction and wear upon the trace are to a great extent avoided. It is obvious, however, that stationary bearings of any kind may be provided without departing from my invention.

What I claim as new, and desire to secure by Letters Patent, is—

1. A draft-equalizer comprising a continuous trace to pass around suitable bearings rigidly secured toward opposite sides of the forward part of a vehicle, and forming a rigid whiffletree, and to be attached at its ends to the harness on opposite sides of the animal hitched thereto, as and for the purpose set forth.

2. In combination with a one-horse vehicle, a curved bar, C, rigidly secured to the front of the vehicle, to receive and serve as a guide for a continuous trace, substantially as described.

3. A draft-equalizing device for one-horse vehicles having their forward ends horizontally concave in form, comprising a plate, $s$, curved to conform to the concave shape of the front portion of the said vehicle, and provided with housings $r$, and rigidly secured to lie within the said concave portion, bearing-surfaces within the said housings, and a continuous trace, D, passing over the rear sides of the said bearings and projecting at each end beyond the extremities of the said plate, substantially as and for the purpose set forth.

4. The combination, with a one-horse cab provided with a horizontally-concaved front, A, and having braces $t$ to support the thills, of a draft-equalizing device comprising a plate, $s$, curved, as shown, to lie within the said front A lengthwise with the concave surface thereof, and secured toward its opposite extremities to the said braces $t$, housings $r$ and $r'$ upon the lower surface of the said plate, pulleys or rollers $q$, within the said housings and rotating upon vertical shafts $p$, backward-projecting arms $m$ upon the housing $r'$ embracing the central vertical rod, $l$, a bolt, $k$, passing through the said arms transversely behind the said rod $l$, and a strip, $i$, passing over the rear sides of the said pulleys or rollers $q$, and projecting at each end beyond the extremities of the said plate, and provided toward each of its extremities with a connecting device, $h$, the whole being constructed and arranged to operate substantially as and for the purpose set forth.

JOHN W. WAINWRIGHT.

In presence of—
   A. B. PULLMAN,
   MASON BROSS.